Oct. 14, 1947.  M. SHOELD  2,428,895
METHOD OF MAKING SILICA CONTAINING GELS
Filed July 26, 1944
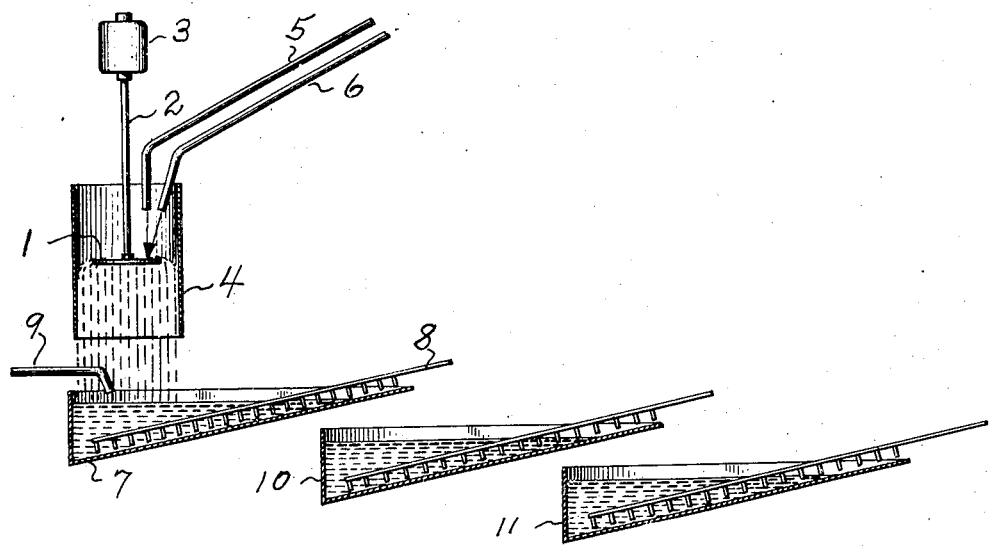
Inventor
*Mark Shoeld,*

Patented Oct. 14, 1947

2,428,895

UNITED STATES PATENT OFFICE 2,428,895

METHOD OF MAKING SILICA CONTAINING GELS

Mark Shoeld, Baltimore, Md., assignor to The Davison Chemical Corporation, Baltimore, Md.

Application July 26, 1944, Serial No. 546,713

4 Claims. (Cl. 252—317)

1

This invention relates to the mixing of substances for effecting chemical reactions, and more particularly has reference to a method and apparatus of producing plural gels.

In the mixing of liquids for effecting chemical reactions in which a thick semi-solid substance is obtained as a reaction product, difficulty is often encountered in the operation of the equipment employed for effecting the mixing.

An object of this invention is to provide a method and apparatus for the mixing of reactants resulting in viscous liquid or semi-solid reaction products.

Another object of this invention is to provide a method and apparatus for the production of alumina silica gels from strong solutions of alkali metal silicate and aluminum sulphate.

Still another object of this invention is to provide a method and apparatus for mixing two or more components for effecting a chemical reaction resulting in a product ranging from a light mush to a substance of semi-solid consistency.

A further object of this invention is to provide a method and apparatus for effecting reactions between liquid reactants impinged upon a surface while the latter is rotated.

With these and other objects in view, the present invention resides in the parts and combinations and steps and procedures diagrammatically represented in the accompanying drawing and referred to in the following specification.

In order to facilitate an understanding of the present invention, reference is made to the accompanying drawing in which the single figure is a diagrammatic representation of a mixing device according to the present invention associated with equipment for assisting in the completion of a reaction instituted in the mixer.

Referring to the drawings, there is shown one embodiment of the present invention which comprises a flat surface in the form of a disc 1 which is mounted on the lower end of a shaft 2. Shaft 2 is mounted for rotation about its axis and may be driven directly by an electric motor 3 or any other source of power or power-transmitting mechanism. Disc 1 is so mounted that its axis of rotation is vertical and its plane of rotation is substantially horizontal. This disc may be constructed of wood, metal, plastic, or any combination of materials—for instance, it may be made of wood or rubber-covered steel. In view of the fact that the materials employed in carrying out a reaction with the device of the present invention are of acid nature, it is advisable to construct the disc of acid-resisting material.

2

Surrounding the disc 1 is a shell 4 which may be constructed of the same material as the disc 1. A suitable material for this purpose may be wood or rubber-covered steel. Shell 4 is suitably spaced from the periphery of the disc 1 and extends from a position well above the upper surface of the disc to a region well beneath the lower surface of the disc.

Extending into the open upper end of the shell 4 are a plurality of conduits 5 and 6. The discharge ends of said conduits are positioned so as to terminate above the upper surface of the disc 1 and are so arranged that the contents discharged from the ends of said conduits will be directed onto substantially the same spot on the upper surface of the disc. By so arranging the conduits 5 and 6, the two streams of reactants discharged from the ends thereof will be intermingled upon impingement on the surface of the disc and will immediately react and be broken up into small particles to insure a thorough mixing and reaction between the same. After impingement of the reactants upon the upper surface of the disc 1, they are thrown outwardly by centrifugal force and impinge against the inner surface of the shell 4 upon which they collect in the form of a semi-solid cake which gradually flows down the inner walls of the shell and is discharged from the lower open end thereof.

In carrying out a procedure in accordance with the present invention for the manufacture of an alumina-silica gel, reactants such as an alkali metal silicate, for instance, sodium silicate, and an aluminum compound such as aluminum sulphate are introduced through the conduits 5 and 6 and discharged onto the upper surface of the disc 1. In this instance, the sodium silicate solution should be at a temperature range between 125 to 150° F. for the most efficient operation of the procedure. Disc 1 should be rotated at a speed ranging from about 100 or 200 up to several thousand revolutions per minute depending upon the type of material to be mixed and the type of product desired. In the case of manufacturing 11 to 13% alumina-silica gel, a 40° Bé. solution of sodium silicate was employed in conjunction with an aluminum sulphate solution of approximately 25 to 30° Bé. concentration.

Upon impingement of the solid streams of the above mentioned solutions upon the rotating disc 1, a reaction takes place more or less instantly, and the resulting product is thrown off the disc against the inner wall of the shell upon which a semi-solid cake builds up to a certain extent and then drops off.

In the manufacture of alumina-silica gel, it has been found desirable to position a vessel beneath the bottom of the shell 4 to receive the reaction product and permit the reaction instituted in the mixer to be carried to completion in the event that this has not been accomplished in the mixer. One form of vessel may comprise a classifier 7 provided with a mechanically actuated rake 8. If the material discharged from the lower end of the shell 4 is of a solid nature, then it may be desirable to introduce water or aluminum sulphate solutions into the vessel of the classifier 7 through a supply conduit 9. The operation of the rake 8 effects discharge of the alumina-silica gel along with some of the solution from the discharge end of the classifier 7. If desired, the discharge from the classifier 7 may be progressively introduced into subsequent classifiers 10 and 11. The discharge from classifier 11 may be separated into liquid and solid phases with the liquid phase containing principally sodium sulphate and a small amount of aluminum sulphate being treated for recovery of the several salts. Alumina-silica gel discharged from the end of the classifier 11 may be introduced into washing equipment for further treatment.

Classifiers 7, 10 and 11 are arranged in such number and are of such size that the reaction initiated in the mixing device is completed by the time the granular alumina-silica gel is discharged from the end of the classifier 11 and transferred to the washing equipment.

In carrying out the reaction between the aluminum sulphate and the alkali metal silicate, an excess of the aluminum sulphate is maintained, as it has been found that more efficient production of the alumina-silica gel is thereby obtained.

In some instances, it may be desirable to introduce into the mixing device streams of an alkali metal silicate, such as sodium silicate, aluminum sulphate and an alkaline substance, such as ammonia or soda ash. In this connection three or more conduits may be employed for the introduction of the reacting components into the mixing apparatus. The flow of the several reactants through the conduits may be adjusted so that any desired proportion of alumina and silica gel may be obtained and the proper excess of aluminum sulphate maintained.

While reference has been made to the addition of a liquid through the conduit 9 to the classifier tank, if the product obtained in the mixer is in the nature of a light mush, the addition of the liquid through conduit 9 is not necessary.

From the foregoing description it will be appreciated that the present invention provides a simple apparatus and method for effecting chemical reactions between liquid substances resulting in viscous products and particularly for the manufacture of alumina-silica gel.

I claim:

1. A method of making an alumina silica gel comprising playing separate streams of an alkali metal silicate and aluminum sulphate and an alkali metal compound more strongly alkaline than the silicate solution onto substantially the same spot on a substantially horizontal rotating surface, and collecting the reaction product discharged from the rotating surface by centrifugal force.

2. A method of making an alumina silica gel comprising playing separate streams of an alkali metal silicate and aluminum sulphate onto substantially the same spot on a substantially horizontal surface rotating about a vertical axis, and collecting the reaction product discharged from the rotating surface by centrifugal force.

3. A method of making an inorganic oxide gel comprising discharging free falling streams of an alkali metal silicate solution and of a solution of a gelling reagent onto substantially the same spot on a substantially horizontal surface, rotating said surface about an axis extending perpendicular thereto and collecting the reaction product discharged from said rotating surface.

4. A method of making an alumina silica gel comprising playing separate streams of an alkali metal silicate and aluminum sulphate and an alkaline compound other than an alkali metal silicate onto substantially the same spot on a substantially horizontal rotating surface, and collecting the reaction product discharged from the rotating surface by centrifugal force.

MARK SHOELD.

REFERENCES CITED

The following references are of record in the file of this patent:

UNITED STATES PATENTS

| Number | Name | Date |
| --- | --- | --- |
| 1,148,194 | Seifert et al. | July 27, 1915 |
| 1,406,791 | Werner | Feb. 14, 1922 |
| 1,756,625 | Behrman | Apr. 29, 1930 |
| 1,629,200 | Buhtz | May 17, 1927 |
| 1,911,644 | Overburg | May 30, 1933 |
| 2,232,727 | Peterkin | Feb. 25, 1941 |
| 2,302,297 | Connolly | Nov. 17, 1942 |
| 1,706,722 | York | Mar. 26, 1929 |
| 1,769,181 | Jackson | July 1, 1930 |
| 1,318,774 | La Bour | Oct. 14, 1919 |

FOREIGN PATENTS

| Number | Country | Date |
| --- | --- | --- |
| 612,315 | France | Oct. 21, 1926 |
| 504,498 | Germany | Aug. 4, 1930 |

Certificate of Correction

Patent No. 2,428,895. October 14, 1947.

MARK SHOELD

It is hereby certified that error appears in the printed specification of the above numbered patent requiring correction as follows: Column 4, line 17, claim 2, after "about a" insert *substantially*; and that the said Letters Patent should be read with this correction therein that the same may conform to the record of the case in the Patent Office.

Signed and sealed this 30th day of December, A. D. 1947.

[SEAL]

THOMAS F. MURPHY,
*Assistant Commissioner of Patents.*